Figure 1:
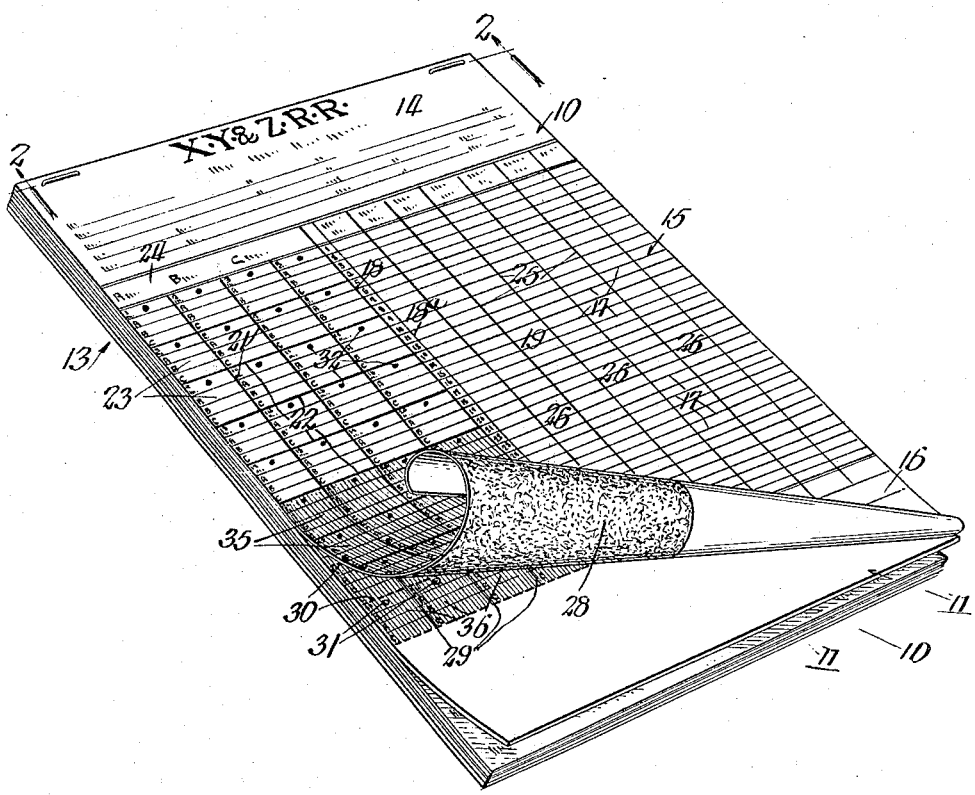

J. W. TAYLOR & O. BEECHAM.
MANIFOLDING RECORD FOR CAR RECORD APPARATUS.
APPLICATION FILED DEC. 23, 1911.

1,164,030.

Patented Dec. 14, 1915.
2 SHEETS—SHEET 1.

Witnesses:

Inventors
Oscar Beecham
John W. Taylor
by Poole & Brown Attys

J. W. TAYLOR & O. BEECHAM.
MANIFOLDING RECORD FOR CAR RECORD APPARATUS.
APPLICATION FILED DEC. 23, 1911.

1,164,030.

Patented Dec. 14, 1915.
2 SHEETS—SHEET 2.

Fig. 3.

Fig. 4.

Witnesses:

Inventors
Oscar Beecham
John W. Taylor
by Poole & Brown Attys

UNITED STATES PATENT OFFICE.

JOHN W. TAYLOR AND OSCAR BEECHAM, OF CHICAGO, ILLINOIS.

MANIFOLDING-RECORD FOR CAR-RECORD APPARATUS.

1,164,030. Specification of Letters Patent. Patented Dec. 14, 1915.

Application filed December 23, 1911. Serial No. 667,457.

*To all whom it may concern:*

Be it known that we, JOHN W. TAYLOR and OSCAR BEECHAM, citizens of the United States, and residents of Chicago, in the county of Cook and State of Illinois, have invented certain new and useful Improvements in Manifolding-Records for Car-Record Apparatus; and we do hereby declare that the following is a full, clear, and exact description thereof, reference being had to the accompanying drawings, and to the letters of reference marked thereon, which form a part of this specification.

This invention relates to an improved manifolding record more particularly adapted for use by railroads in keeping a record of the daily location, disposition and condition of freight cars. Our improved manifolding record is designed especially for use in connection with the form of car-record apparatus described in Letters Patent No. 618,388, dated January 31st, 1899.

The invention consists of the matters hereinafter described and more particularly pointed out in the appended claim.

The apparatus described in the aforesaid patent is intended to keep before the persons having control of the freight cars of a railway the location of such cars, their condition as to whether out of order or undergoing repairs, whether they are loaded or unloaded, whether upon the road owning them or transferred to some other road, and other information required for the proper management of the carrying business of the railway. Said apparatus consists generally of a car-record board which is provided with a large number of spaces, each of which is appropriated to a single car, is numbered to correspond with the car, and is provided with a holding-pin, on which may be placed record cards or tickets used for indicating the dates on which the car is moved, its condition as to whether loaded or unloaded, or other information. The tickets employed are of different colors to represent different conditions of the car—as, for instance, one color may be used to indicate that the car is empty, another that it is loaded and in transit, another that it is undergoing repairs, and another that it is upon some other road. In connection with such car-record board is employed a second record-board called the "interchange-board," which is like the board first mentioned, with the exception that each rectangular space thereof is appropriated not to a car, but to a railroad upon which cars may be transferred from the road using the record. Such interchange-board is adapted to receive car-record cards numbered to correspond to the cars which are transferred to the several roads. The said record or working board and the interchange-board, with the record-cards thereon, constitute a visible indication of record of the cars belonging to a railway, from which the superintendent of transportation can ascertain by inspection the distribution of the cars and their location at any one time, the number which is in use, and other matters of information important and necessary for the handling of freight traffic. The information for making out the record-cards is taken from written reports made on suitable record-sheets sent each day by the freight conductors having charge of the freight trains.

Our invention relates particularly to a manifolding record so constructed that when the original report made out by the freight conductor and mailed each day to the road, is written by said conductor, a carbon copy in the case of each car is made, said carbon copy appearing upon square or rectangular tags forming part of a sheet of card-board on which are defined a plurality of such tags corresponding in number to the number of cars that the original sheet is capable of containing a record of, the sheet of card-board being so constructed that it is capable of easy separation into the small cards or "tags" which it includes. A perforation is made in each rectangular space so that when the card-board sheet is severed into parts each constituting a record-tag for a car, said record-tags are ready to be placed on the pins of the car-record board.

As the system described in the patent aforenamed is at present carried out, it is necessary that the railroad owning the record have the records of each car typewritten on the record cards or tags from the original sheet sent in by the freight conductor, and the object of the present invention is to eliminate the time and labor required in doing this, our improved manifolding record being such that when the conductor makes the original record, he at the same time produces a record-card or tag for each car adapted for use in connection with the car-record board.

Figure 2:
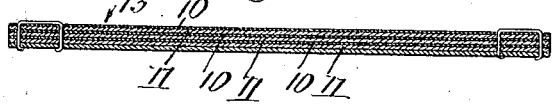

Referring to the drawings—Figure 1 is a view representing a block of paper composed of our improved manifolding records; Fig. 2 is a view representing a transverse section through the same on the line 2—2 of Fig. 1; Fig. 3 is a top plan view of one of the sheets forming part of the manifolding record; Fig. 4 is a view representing a top plan view of the card comprising the plurality of small cards or tags on which the carbon copies are made as the original is made out by the train conductor.

In the drawings, 10 indicates an original sheet on which the original record is made by the freight conductor. 11 indicates a sheet of card-board or heavy paper constructed to provide a plurality of rectangular spaces 12 corresponding to the number of cars of which the original sheet 10 is designed to receive a record, and each adapted, as will presently appear, to receive a carbon copy of the record made in connection with each car and constituting a record tag for said car. The sheet 10 and the card 11 together comprise the manifolding record to be filled out each day by a conductor with reference to all of the cars on his train. A number of these are preferably bound together and made into a block 13 for convenience in handling.

As shown in the drawings, the original sheet 10 is ruled transversely to divide it into three parts, a top part 14, a middle part 15 which occupies the greater part of the sheet, and a bottom part 16. The top part 14 and the bottom part 16 are printed in the usual manner and are adapted to receive data relating generally to the whole train.

The middle part 15 is preferably ruled transversely by horizontal lines 17 extending across the sheet and is divided vertically by a line 18 into a general record section 19 on the right-hand side of the sheet, as shown in the drawings, and a car-tag-space-section 20 on the left-hand side of the sheet. Said car-tag-space-section is ruled with a plurality of horizontally spaced vertical lines 21 dividing said section into a plurality of vertically extending spaces, in this case, four. It is also divided vertically by means of a plurality of vertically spaced, heavy transverse lines 22, each line 22, as shown, corresponding with one of the horizontal lines 17. Said vertical lines 21 and said transverse lines 22 divide the car-tag-space-section 20 into a plurality of car-tag-spaces 23 arranged in vertical and horizontal rows each adapted to have inscribed upon it the information with regard to a single car required on the car record cards or tags in the use of the car record apparatus heretofore referred to. Five items are usually required on said car record cards or tags as now used: the date, the car initials, the car number, the station at which the car is left, and the condition of the car as to being loaded or empty. The latter may be indicated by an agreed mark or by a different color for the car-tag-spaces relating to empty cars as will presently appear. This leaves four items for which spaces or lines must be provided in the car tag spaces. Accordingly on the record sheet, as shown herein, the heavy horizontal lines dividing the car-tag-space-section 20 of the sheet transversely are made to correspond with the fourth horizontal line 17 on the sheet and with lines the numerical order of which from the top of the sheet are indicated by multiples of four. Thus each car-tag-space 23 includes four horizontal lines or spaces,—a line for the date, a line for the car initials, a line for the car number, and a line for the station at which the car is left. On each of said lines are printed, preferably at the left-hand side of each car-tag-space, respectively, the word "Date" and letters "A, B, C" or other symbols corresponding to a key 24 printed above the check-section. Any number of horizontal lines may, however, be ruled on the car-tag-spaces as the number of said lines has no necessary relation to the number of horizontal lines or spaces on the record section of the sheet.

It will be noted that there are as many vertical columns of car tag spaces as there are horizontal spaces on the record section opposite each horizontal row of car tag spaces. The car tag spaces are numbered from left to right, taking each horizontal row in succession and the lines 17 are numbered from the top to the bottom of the record section in numerical order. As shown a vertical line 18$^a$ is ruled adjacent the line 18 which divides the sheet transversely, thus defining a vertically extending space in which the numbers indicating the numerical order of the lines 17 are printed. Each car tag space thus has a line 17 horizontally opposite it that bears the same number.

The record section 19 is divided transversely by vertical lines 25 to provide columns 26 for the usual items pertaining to each car, but which are not required to appear on the record tags of the car record apparatus, said items being indicated at the top of the respective columns in a familiar manner.

The sheet of card-board 11, as shown in the drawings, is of the same size as the original sheet 10 and is arranged to lie beneath said sheet, the original sheet being provided as shown in the drawings, with carbon reproducing means 28 above the checks 12. The part of the card-board containing the car tags 12 is as shown ruled vertically and transversely to correspond with the tag space section 20 of the original sheet, so that the tags 12 each register with an associated tag-space 23 and has horizontal lines 12$^a$ registering with the lines 17 of the original record sheet. The card-board sheet along the vertical and horizontal lines dividing it into the tags 12 is weakened in order to provide for ready separation of the tags comprising the sheet, and as shown in the drawings, said sheet is provided with vertical cuts 29 along the vertical lines dividing the tags and with horizontal score marks or lines of perforations 30 along the transverse lines dividing the tags. Thus after the record has been written and sent to the home office, the sheet of card-board may be readily divided into vertical strips by reason of the cut lines 29 and the vertical strips may then be easily severed to separate the tags included in them by reason of the score marks or lines of perforations 30.

A hole or aperture 31 is formed in each tag 12 near its upper end at the middle, said hole being adapted to receive the pin on the car record board when the record check is filed thereon. The tag-spaces 23 on the original sheet are provided with corresponding black or colored dots or marks 32 adapted to register above the holes or openings 31 in the tags of the card-board sheet so as to indicate the position of said openings and thus prevent the one making the record from inserting his pencil through the paper of the original sheet at this point.

In filling out the original sheet, the date, the car initials, the car number and the station at which the car is left are written on the tag-spaces 23 in order proceeding from left to right and the other general data intended to appear on the original sheet only is written in the case of each car in the proper column on the line 17 of the record section corresponding in number to the number of the check-space. Thus a carbon copy will be made on a record tag in the case of each car as the original record is made.

In order to indicate whether the cars are empty or filled, a suitable agreed symbol or mark may be adopted to be placed on each tag-space, a carbon copy of which will appear on the associate record tag of the cardboard sheet. It is preferable, however, to have a certain number of the tag-spaces 23 on the original sheet colored, as indicated at 35, to indicate the empty cars, and the associated tags on the card-board sheet colored in like manner as indicated at 36. Then in case of the empty cars the record will be made on one of the colored tag-spaces instead of on one of the uncolored tag-spaces, the rest of the record of the car being carried out on the right-hand record section on the line corresponding in number to the number of the tag-space used.

It is apparent that by the use of our improved construction the car tags are made out at the time the original sheet is inscribed so that it is only necessary when the record reaches the office to sever the card-board sheet into its component parts and place the tags on the proper pins on the car record board.

We claim as our invention—

A manifolding record comprising an original inscription receiving sheet ruled vertically to provide a main record section and a tag space section, said tag space being divided into a plurality of rectangular tag spaces by vertical and horizontal lines of ruling, said spaces thus being arranged in a plurality of horizontal and vertical rows, the main record section of said sheet having ruled lines thereon to provide horizontally extending spaces, there being as many of said horizontally extending spaces on the record section adjacent each horizontal row of rectangular tag spaces as there are tag spaces in each horizontal row, a second sheet of material heavier than said original inscription sheet and upon which said original sheet is superposed, said second sheet having a blank part and a multiple tag part of an area equal the area of said tag space on said original sheet, said multiple tag part being divided by horizontal lines of weakening and by vertically arranged slits, into a plurality of tags arranged in the same order as the tag spaces on said original sheet and which correspond and register therewith when said sheets are so superposed, each of said tags being provided near its top with an aperture and each tag space of the original sheet having a dot or mark covering the aperture in its associated tag, and a carbon means interposed between the tag portions of said sheets.

In testimony that we claim the foregoing as our invention we affix our signatures in the presence of two witnesses, this 18th day of December, A. D. 1911.

JOHN W. TAYLOR.
OSCAR BEECHAM.

Witnesses:
GEORGE R. WILKINS,
T. H. ALFREDS.

Copies of this patent may be obtained for five cents each, by addressing the "Commissioner of Patents, Washington, D. C."